United States Patent
Berger et al.

(10) Patent No.: US 12,258,643 B2
(45) Date of Patent: Mar. 25, 2025

(54) LASER SHOCK PEENING APPARATUS

(71) Applicant: Airbus SAS, Blagnac (FR)

(72) Inventors: Tyler T. Berger, Johnstown, OH (US); Devin R. Hilty, Westerville, OH (US); Mark D. Bloomberg, Columbus, OH (US); Gary Grossenbacher, Dublin, OH (US); Jeff L Dulaney, Dublin, OH (US)

(73) Assignee: Airbus SAS, Blagnac (FR)

( * ) Notice: Subject to any disclaimer, the term of this patent is extended or adjusted under 35 U.S.C. 154(b) by 270 days.

(21) Appl. No.: 16/834,879

(22) Filed: Mar. 30, 2020

(65) Prior Publication Data

US 2021/0301367 A1    Sep. 30, 2021

(51) Int. Cl.
| | |
|---|---|
| *C21D 10/00* | (2006.01) |
| *B23K 26/12* | (2014.01) |
| *B23K 26/14* | (2014.01) |
| *B23K 26/356* | (2014.01) |

(52) U.S. Cl.
CPC .......... *C21D 10/005* (2013.01); *B23K 26/127* (2013.01); *B23K 26/1436* (2015.10); *B23K 26/356* (2015.10)

(58) Field of Classification Search
CPC .................. B23K 26/12; B23K 26/123; B23K 26/127–128; B23K 26/14–1436; B23K 26/356; B23K 26/0096; C21D 10/005
See application file for complete search history.

(56) References Cited

U.S. PATENT DOCUMENTS

| | | | | |
|---|---|---|---|---|
| 4,937,421 A | * | 6/1990 | Ortiz, Jr. ................ | B23K 26/18 219/121.68 |
| 5,741,559 A | * | 4/1998 | Dulaney ................ | B05D 3/06 427/372.2 |
| 5,771,260 A | * | 6/1998 | Elliott .................... | G02B 7/00 372/55 |
| 5,790,620 A | * | 8/1998 | Okazaki ............... | B23K 26/356 376/310 |
| 6,064,035 A | * | 5/2000 | Toller ................... | B23K 26/123 219/121.84 |
| 6,291,794 B1 | * | 9/2001 | Dulaney ............ | B23K 26/0673 219/121.76 |
| 6,469,275 B2 | | 10/2002 | Dulaney et al. | |
| 6,528,763 B1 | | 3/2003 | Lahram et al. | |
| (Continued) | | | | |

FOREIGN PATENT DOCUMENTS

| | | | | |
|---|---|---|---|---|
| CN | | 208414504 U | * 1/2019 | |
| WO | WO-2018049694 A1 | * 3/2018 | ........... | B23K 26/034 |
| WO | 2019209786 A1 | 10/2019 | | |

*Primary Examiner* — Helena Kosanovic
*Assistant Examiner* — Thao Uyen Tran-Le
(74) *Attorney, Agent, or Firm* — Greer, Burns & Crain, Ltd.

(57) ABSTRACT

A system for performing a laser peening application on a workpiece. A purge system is included with the system to provide a compartment housing combustion sources with compressed air so that the compartment has an increased air pressure. Also, a method of operating the system in which power is provided to the system, but only the purge system operates initially. Only after the purge system has bene operating, are the other subsystems and components of the systems, like the laser, provided with operational power.

10 Claims, 4 Drawing Sheets

(56) References Cited

U.S. PATENT DOCUMENTS

| | | | | |
|---|---|---|---|---|
| 6,551,383 B1* | 4/2003 | Richardson, Jr. | ...... | B01D 46/62 |
| | | | | 96/138 |
| 6,713,716 B1* | 3/2004 | Lawrence | ............ | B23K 26/146 |
| | | | | 219/121.68 |
| 6,923,877 B1* | 8/2005 | Anderson | ............ | C21D 10/005 |
| | | | | 427/457 |
| 7,750,266 B2* | 7/2010 | Dane | .................. | B23K 26/0622 |
| | | | | 219/121.85 |
| 9,144,861 B2 | 9/2015 | Sokol et al. | | |
| 2003/0024904 A1* | 2/2003 | H. Clauer | ............ | C21D 10/005 |
| | | | | 219/121.6 |
| 2003/0038123 A1* | 2/2003 | Dykes | .................. | B23K 26/009 |
| | | | | 219/121.85 |
| 2005/0061778 A1* | 3/2005 | Arakawa | ............ | B23K 26/1436 |
| | | | | 219/121.6 |
| 2009/0314824 A1* | 12/2009 | Sawaguchi | ............. | C23C 24/04 |
| | | | | 228/173.2 |
| 2014/0265047 A1* | 9/2014 | Burris | .................. | B23K 26/034 |
| | | | | 264/497 |
| 2015/0352655 A1* | 12/2015 | Watters | .................. | G05D 16/20 |
| | | | | 700/282 |
| 2016/0136757 A1* | 5/2016 | May | .................... | B23K 26/0624 |
| | | | | 219/121.61 |
| 2016/0352062 A1* | 12/2016 | Takigawa | ............. | B23K 26/21 |
| 2017/0144223 A1* | 5/2017 | Gold | ........................ | B28B 1/001 |
| 2017/0165791 A1* | 6/2017 | Kamachi | .............. | B23K 26/126 |
| 2017/0341177 A1* | 11/2017 | Uraguchi | ............. | G21C 13/036 |
| 2020/0047287 A1* | 2/2020 | Sievers | ................. | B29C 64/268 |
| 2021/0268605 A1* | 9/2021 | Gorju | .................... | C21D 10/005 |

\* cited by examiner

LASER SHOCK PEENING APPARATUS

TECHNICAL FIELD

This invention relates to laser shock peening, and more particularly to a system used for performing a laser shock peening application on a workpiece.

BACKGROUND

In some laser shock peening operations, a laser peens a surface by exciting water molecules which provide a shockwave to the surface. Recently, such an operation has been applied to hidden surfaces, such as cavities, of a workpiece. This has resulted in the newer devices for laser peening, such as those disclosed in WO 2019/209786.

The use of laser peening in aerospace applications difficult because of the use of laser (a combustion source) and the possibility of flammable or combustible gases. Accordingly, various requirements and regulations exist regarding the use of combustion sources in aircraft applications to minimize the chances that a dangerous situation occurs based on the presence of the combustion source. While it would be conceivable to build a laser peening device and system out of individual components, it is believed that such a system while effective may not be economically practical.

Accordingly, there is a need for an efficient and effective laser peening device and system which are design to be used in aerospace applications.

SUMMARY

A new laser peening device and system have been invented that is designed to be used in aerospace applications. Specifically, the new laser peening device and system utilize a purge system to pressurize and clear one or more compartments in the system that house combustion sources, specifically, the laser. Additionally, various methods of operating the device and system, including new processes for powering up the device and system have also been invented. These methods and processes utilize the purge as a failsafe to ensure that the compartments have been pressurized and purged before fully powering up the device and generating a laser.

Accordingly, in at least one aspect, the present invention may be generally characterized as providing a system for a laser peening application with a laser having: an enclosure with a laser configured to generated a laser beam; an applicator device configured to apply the laser beam to a surface of a workpiece to perform the laser peening application; and, a source of compressed air configured to provide compressed air to at least one compartment of the enclosure. The applicator device may be in communication with the enclosure and configured to receive the laser beam from the enclosure. The enclosure may include one or more compartments, and the laser may be located in one of the compartments of the enclosure.

The system may further include a purge system which includes the source of compressed air and a controller configured to control a flow of the compressed air to the at least one compartment. One or more components of the purge system may be attached to the enclosure. The system may be configured to generate the laser beam only after the compressed air has been provided to the at least one compartment of the enclosure. The purge system may include a sensor configured to determine a pressure in the compartment. The controller of the purge system may be configured to maintain a positive pressure within the at least one compartment.

It is contemplated that the at least one compartment includes a door for selective access to the at least one compartment. The laser may be disposed in the at least one compartment. The door may include a seal. The system may include a controller, and the door may include a lock that is configured to be controlled by the controller.

In another aspect, the present invention may generally be characterized as providing a process for a laser peening a surface a workpiece by: providing power to an enclosure, the enclosure having a purge system and a laser configured to generate a laser beam in a compartment, the purge system having a source of compressed air and a controller; providing compressed air to the compartment for a predetermined amount of time; only after the predetermined amount of time, generating a laser beam; and laser shock peening the surface of the workpiece.

The process may include continuing to supply compressed air to the compartment so long as the laser beam is generated.

It is contemplated that the process includes maintaining a positive air pressure within the compartment of the enclosure.

It is further contemplated that the process includes monitoring an air pressure of the compartment of the enclosure with at least one sensor. The process may include adjusting a flow of compressed air to the compartment based on the monitored air pressure.

These aspects, embodiments, and features, which may be combined in any manner, are described in more detail below and shown in the attached drawings.

DESCRIPTION OF THE DRAWINGS

One or more exemplary embodiments of the present invention will be described below in conjunction with the following drawing figure, in which.

DETAILED DESCRIPTION

As noted above, the present invention is directed at providing a new laser peening device and system to be used in aerospace applications. The new device and system utilize a purge system to pressurize and clear one or more compartments in the system that house combustion sources including the laser. Additionally, methods and processes have been invented utilize the purge system as a failsafe to ensure that the compartments have been pressurized and purged before fully powering up the device and generating a laser.

With these above general aspects of the present invention in mind, one or more embodiments of the present invention will be described with the understanding that the following description is not intended to limit the present disclosure.

Figure 1:
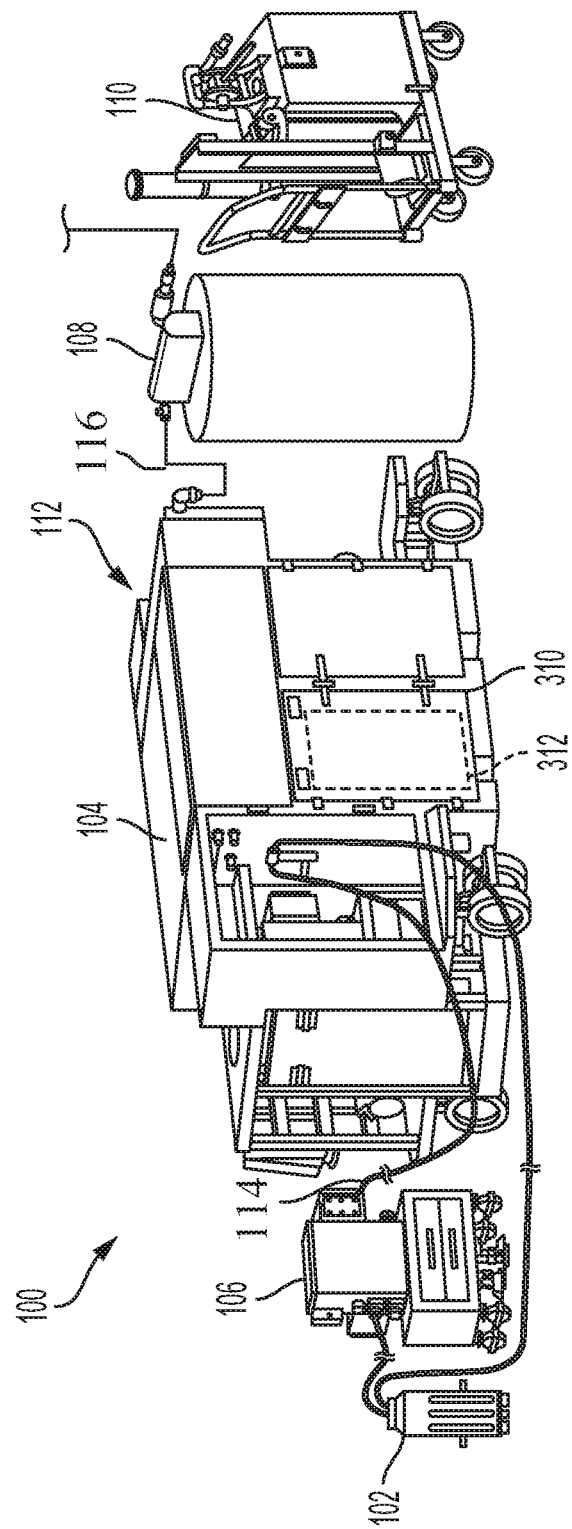
FIG. 1 is a schematic view of a system for performing laser shock peening that is used in accordance with various aspects of the present invention.

FIG. 1 depicts a system 100 for performing laser shock peening at multiple surface locations on one or more workpieces. This system 100 is particularly suitable for performing laser peening at the inner surfaces of a bore in a workpiece, and in particular for the multiple spar fastener bores in an aircraft wing. However, such a use is not intended to be limiting.

As shown in FIG. 1, the system 100 generally includes an applicator device 102, an enclosure 104, a verification stand 106, a vacuum 108, and a water system 110. The applicator device 102, discussed in more detail below, is the component of the system 100 that interacts with the surface(s) of a workpiece for performing the laser shock peening operation thereon.

The enclosure 104 houses the components that provide the applicator device 102 with a laser beam, power, overly water, and a flow of air. The enclosure 104 further includes a user interface or input device like a touch screen, keyboard, mouse, or the like and a controller for providing the applicator device 102 with control signals for operating motors that insert, advance, retract, and rotate the delivery device in a workpiece bore. As discussed in more detail below, the enclosure 104 also includes a purge system 112.

As will be appreciated, a "controller", as used throughout this application, means a processing unit that includes one or more processors configured to cause a series of steps to be performed so as to implement methods such that instructions, when executed by a computing device or other programmable apparatus, may cause the functions/acts/steps specified in the methods described herein to be executed. The processors may be, for example, any type of general-purpose processor, microprocessor, controller, microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The controller may also include memory that is any suitable known or other machine-readable storage medium. The memory may be a non-transitory computer readable storage medium such as, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to the controller such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory may include any storage means (e.g., devices) suitable for retrievably storing the computer-executable instructions executable by the processor. Computer-executable instructions may be in many forms, including program modules, executed by one or more computers or other devices. Generally, program modules include routines, programs, objects, components, data structures, etc., that perform particular tasks or implement particular abstract data types. Typically, the functionality of the program modules may be combined or distributed as desired in various configurations, arrangements, or embodiments.

Returning to FIG. 1, the verification stand 106 is operatively interposed between the enclosure 104 and the applicator device 102. This component of the system 100 also includes a controller for evaluating the laser beam at the applicator device 102 to verify characteristics such as spot size, energy, temporal profile, etc. and confirm that the laser being applied by the applicator device 102 meets the desired characteristics to ensure consistent and even laser shock peening application on the surface of the workpiece being treated.

Umbilical cords 114 provide for communication between the enclosure 104 with the applicator device 102 and the verification stand 106, as well as convey power, overlay water, air, and control signals as needed for the enclosure 104 to operate both the applicator device 102 and the verification stand 106. Each umbilical cord 114 may contain one or more conduits, cables, pipes, optical fibers, or other structures which provide power, control signals, data signals, water, the laser, vacuum, and compressed air.

The vacuum 108 is configured to provides a source of negative pressure to the applicator 102 so that water, dispensed from the applicator 102, can be collected. An air line 116 is extended from the vacuum 108 to the enclosure 104 and the negative pressure is provided to the applicator 102 through the umbilical cord 114.

Figure 2:
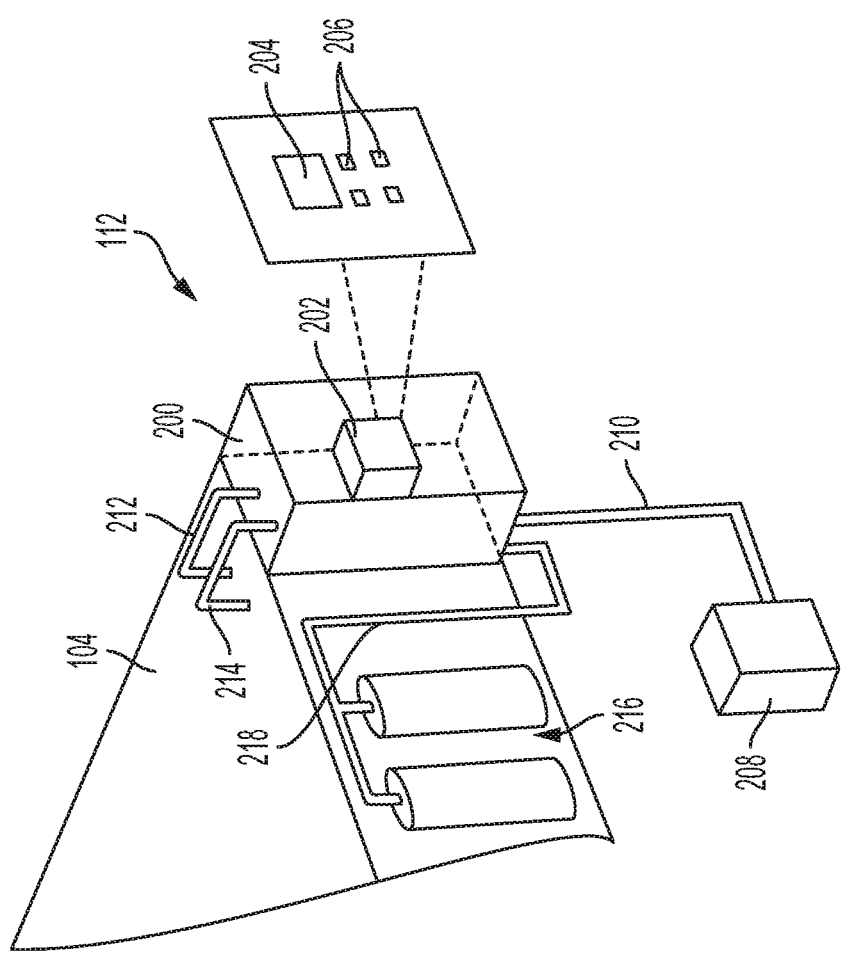
FIG. 2 depicts a partial front and side, partially exploded view of a purge system used in accordance with various aspects of the present invention.

Turning to FIG. 2, the purge system 112 comprises an enclosure 200 which is separate from enclosure 104 of the laser peening system 100 but may be secured thereon. The enclosure 200 of the purge system 112 houses a controller 202 (separate from the controller of the laser peening system 100), pneumatics, electrical I/O, and a user interface having a display screen 204 and various buttons 206. The enclosure 200 of the purge system 112 is in communication with a source of compressed air 208, such as a pump, via a line 210. The enclosure 200 of the purge system 112 also has a supply line 212 for providing compressed air to the enclosure 104 of the laser peening system 100 and a return line 214 for recovering compressed air from the enclosure 104. The air recovered from the enclosure 104 may be passed to an air filter 216, via a line 218, before being vented to the environment. It is also contemplated that a pump would be in a pneumatic circuit with a vacuum source used by the system 100, so that the in addition to providing compressed gas, the pump functions as a of negative pressure for a vacuum system.

As mentioned above, the purge system 112 is used to remove any combustible gases contained within the enclosure 104, and more particularly in the compartments of the enclosure 104 that include possible ignition sources. It is particularly advantageous that the gas used for the purge system 112 is air, and more particularly atmospheric air. This allows the purge system 112 to use a readily available source of gas for the compressed air, and does not utilize any dangerous or noxious gases. Additionally, this also allows the gas to be vented to the atmosphere. Finally, the use of atmospheric air as the compressed air allows the enclosure 104 to be portable and moveable without regard to a separate source of gas for the purge system 112.

Figure 3:
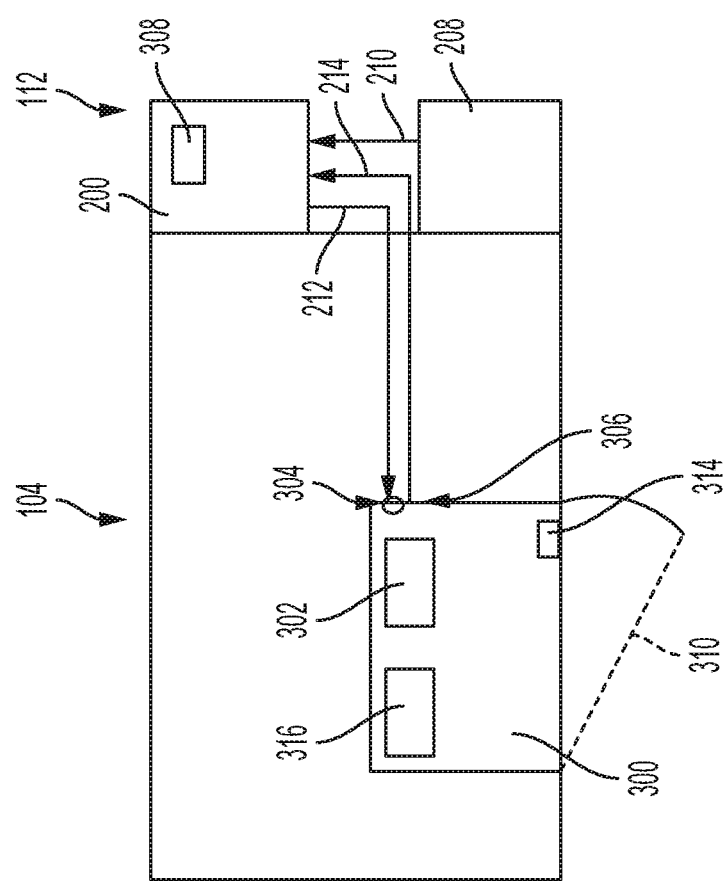
FIG. 3 is a top schematic view of the enclosure with the purge system used in accordance with various aspects of the present invention; and, FIG. 4 is a side view of an applicator device used in accordance with various aspects of the present invention.

Turning to FIG. 3, the enclosure 104 includes at least one compartment 300 housing a laser 302 which is configured to generate a laser beam. The compartment 300 includes an inlet 304 for compressed air from the supply line 212 and an outlet 306 for supplying air to the return line 214.

The controller 202 of the purge system 112 is configured to control the amount of compressed air supplied to the compartment 300 by, for example, controlling a valve (not shown) to vary/adjust the amount of compressed air. Additionally, or alternatively, the controller 202 the purge system 112 may be in communication with the source of compressed air 208 and may be configured to send signals to adjust the output of the source of compressed air.

A sensor 308, for example in the enclosure 200 of the purge system 112, may be configured to obtain information from the supply line 212 or return line 214 that is used by the controller 202 of the purge system 112 to determine the pressure in the compartment 300. Thus, the controller 202 of the purge system 112 may be configured (i.e., programmed) to monitor the measured pressure in the compartment 300 at preselected time intervals (i.e., every 15 seconds, 30 second, 1 minute, 2 minutes, 5 minutes) and adjust the air flow in the supply line 212 in order to achieve a desired or preset pressure level. The appropriate level of pressure and the time intervals can be determined by those of ordinary skill in the art depending on a variety of factors.

As shown in FIGS. 1 and 3, the enclosure 104 may include a door 310 for accessing the components in the compartment 300. The door 310 may include a seal 312 (see, FIG. 1) formed from a compressible material that allows for the pressure of the compartment 300 to be increased when the door 310 is closed. Additionally, the door 310 may include a lock 314 that is controlled by the controller 316 of the laser peening system 100 (shown in FIG. 3 within compartment 300 as an example) to prohibit the door 310 from being opened, for example, while the laser 302 is generating the laser beam.

In an exemplary method of operation of using the laser peening system 100, power is initially supplied to the laser peening system 100. However, before powering up all of the various systems and components of the system, only, or substantially only, the purge system 112 is operated for a predetermined amount of time (i.e., 1 minute, 2 minutes, 5 minutes). Again, the exact amount of the predetermined amount of time may depend on a variety of individual aspects for the system 100 and thus may be determined by one of ordinary skill in the art. Once the predetermined time has passed, the controller 202 of the purge system 112 may send a signal to the controller 316 of the laser peening system 100 indicating that power may now be provided to the other components and sub-systems of the system 100, including, for example, the laser 302.

As noted above, the controller 202 of the purge system 112 may monitor the pressure of the compartment 300 (via, for example, the sensor 308). If the pressure is below a predetermined level, the controller 202 may send one or more signals to increase or decrease the flow of the compressed air.

By using the purge system 112, the laser peening system 100 effectively and efficiently provides a laser beam for a laser peening application.

Figure 4:
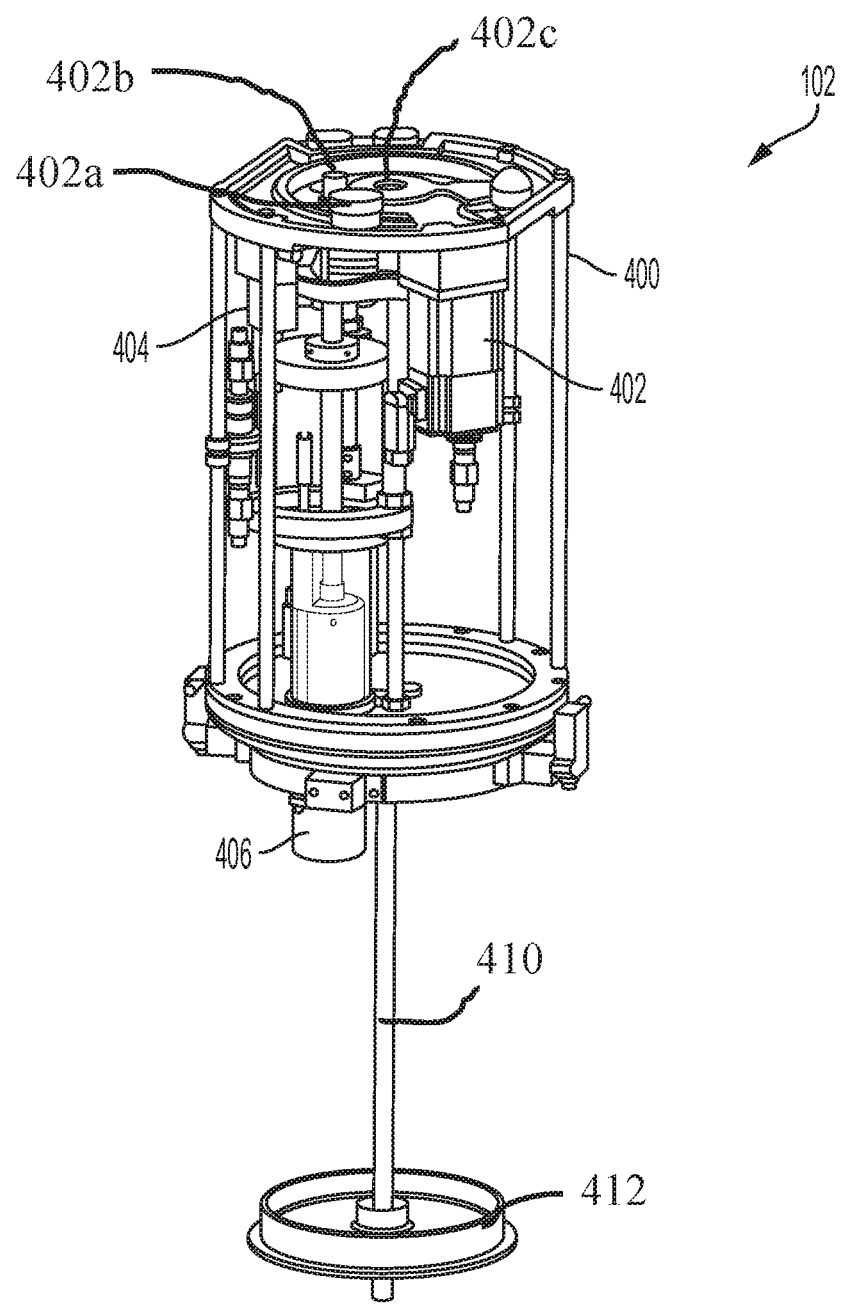

Turning to FIG. 4, the applicator device 102 is shown in more detail. The depicted applicator device 102 is merely exemplary. In the depicted example, the applicator device 102 has multiple components supported on a frame 400. The applicator device 102 includes various couplings for power 401a, water supply, compressed air, and water return 402b and a laser 402c, each provided via the umbilical cords 114 (see FIG. 1). The applicator device 102 a motorized rotational drive 402 and a motorized vertical drive 404 for moving a laser peening pen 406. The laser peening pen 406 is disposed at one end of the frame 400 and applies the laser beam and water to the surface of the workpiece for a laser shock peening treatment.

Generally, the applicator device 102 may be secured to a workpiece and the first treatment of the inner surfaces of the bore started. For examples the applicator device 102 may include an elongated shaft 410 and a removable cap 412 that is secured to the elongated shaft 410. For an aperture being treated, the frame 400 is disposed on one side of the aperture and the removable cap is disposed on the opposite side of the aperture.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A system for a laser peening application with a laser, the system comprising:
    an enclosure having a laser configured to generate a laser beam, the enclosure having one or more compartments, the laser disposed in a first compartment;
    an applicator device comprising a laser peening pen configured to apply the laser beam to a surface of a workpiece to perform the laser peening application, the applicator device configured to receive the laser beam from the enclosure, wherein the applicator device is positioned outside the enclosure of the laser; and,
    a purge system comprising:
        an enclosure separate from the enclosure of the laser;
        a supply line connected to the enclosure of the purge system and the enclosure of the laser for supplying compressed air to a space within the first compartment of the enclosure of the laser to remove combustible gases contained within the first compartment;
        a return line connected to the enclosure of the purge system and the enclosure of the laser for recovering compressed air and combustible gases from the first compartment;
        a compressed air line connected to a source of compressed air configured to provide compressed air to the enclosure of the purge system.

2. The system of claim 1, wherein the purge system further comprises a controller configured to control a flow of the compressed air to the first compartment.

3. The system of claim 2, wherein the purge system comprises a sensor configured to determine a pressure in the first compartment.

4. The system of claim 3, wherein the controller of the purge system is configured to maintain a positive pressure in the first compartment.

5. The system of claim 1, wherein at least a portion of the enclosure of the purge system is attached to the enclosure of the laser.

6. The system of claim 1, wherein the system is configured to generate the laser beam only after the compressed air has been provided to the space within the first compartment of the enclosure of the laser.

7. The system of claim 1, wherein the first compartment includes a door for selective access to the first compartment.

8. The system of claim 7, wherein the door comprises a seal.

9. The system of claim 7, further comprising a controller, wherein the door comprises a lock that is configured to be controlled by the controller.

10. The system of claim 1, further comprising an air venting line with an air filter such that air recovered from the enclosure of the purge system is passed to the air filter, via the air venting line, before being vented to the environment.

\* \* \* \* \*